Figure 9:
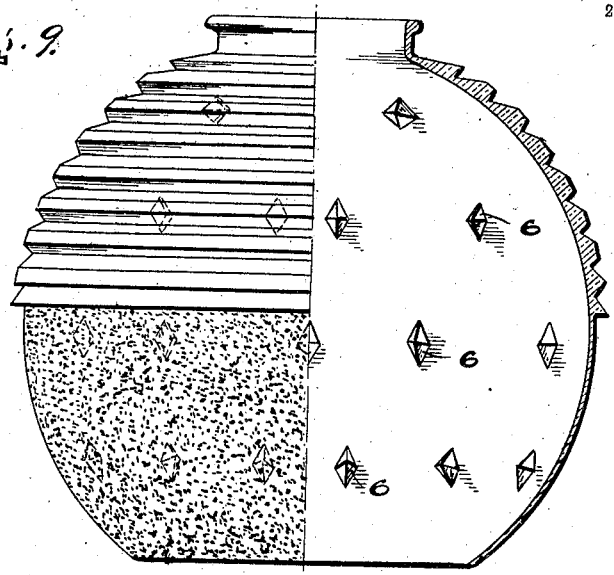

No. 821,308. PATENTED MAY 22, 1906.
O. A. MYGATT.
DECORATIVE GLASS SHADE.
APPLICATION FILED DEC. 21, 1904.
2 SHEETS—SHEET 1.
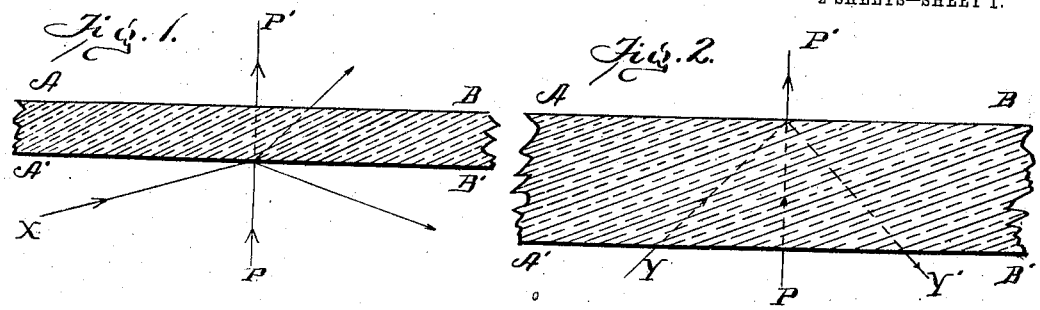
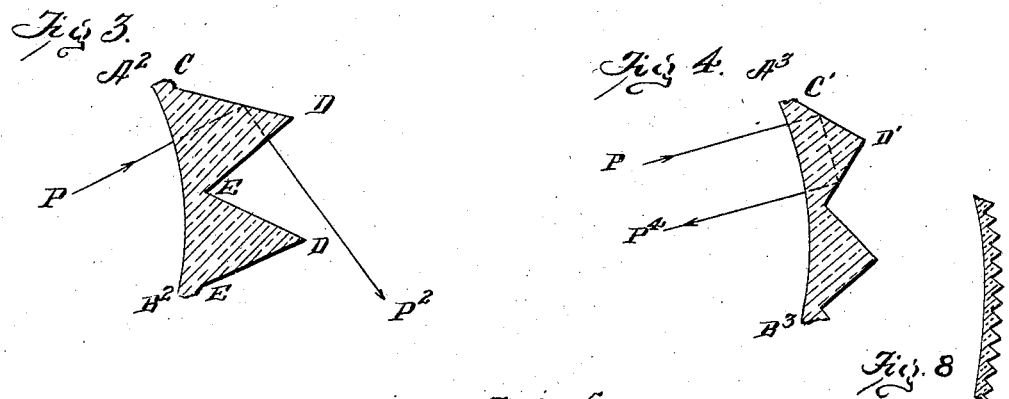
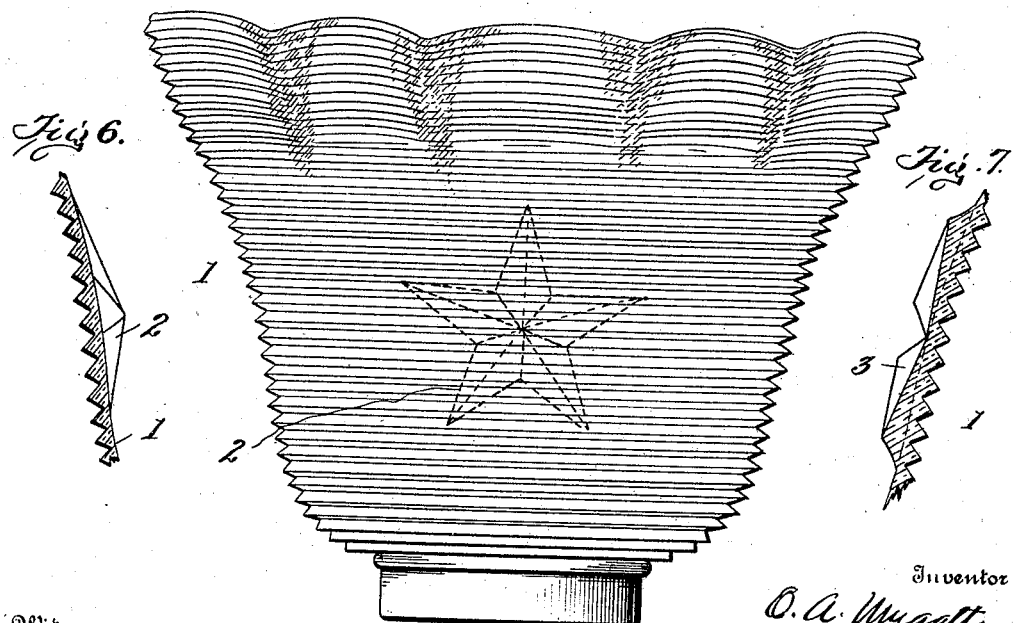
Witnesses
Chas. K. Davis.
Robert W. Gill.
Inventor
O. A. Mygatt
By
W. A. Bartlett
Attorney No. 821,308. PATENTED MAY 22, 1906.
O. A. MYGATT.
DECORATIVE GLASS SHADE.
APPLICATION FILED DEC. 21, 1904.

2 SHEETS—SHEET 2.

Witnesses
Chas. K. Davies
Robert W. Gibb

Inventor
O. A. Mygatt
By W. A. Bartlett
Attorney

UNITED STATES PATENT OFFICE.

OTIS A. MYGATT, OF NEW YORK, N. Y.

DECORATIVE GLASS SHADE.

No. 821,308.　　　　　Specification of Letters Patent.　　　　Patented May 22, 1906.

Application filed December 21, 1904. Serial No. 237,838.

*To all whom it may concern:*

Be it known that I, OTIS A. MYGATT, a citizen of the United States, residing at New York, in the county of New York and State of New York, have invented certain new and useful Improvements in Decorative Glass Shades, of which the following is a specification.

This invention relates to decorative glass shades for artificial lights.

The object of the invention is to produce a globe or shade for lamps, gas-burners, electric lights, &c., which shall be decorative in appearance and shall have the advantage of directing a large part of the light-rays, which are generally lost, into useful position by changing the direction of many or most of the light-rays escaping from a part, generally the upper part, of the surface of the shade.

My invention consists in the construction of shades or globes for lamps in a manner to largely combine the illuminating excellence of prismatic shades or globes with the ornamental features of decoration, many of which have been separately used heretofore.

In carrying out my invention I avail myself of certain principles or laws of optics which are possibly understood by experts, but which I am unable to find briefly stated in text-books and which I will therefore state herein, referring to certain diagrams shown in the drawings.

Figure 10:
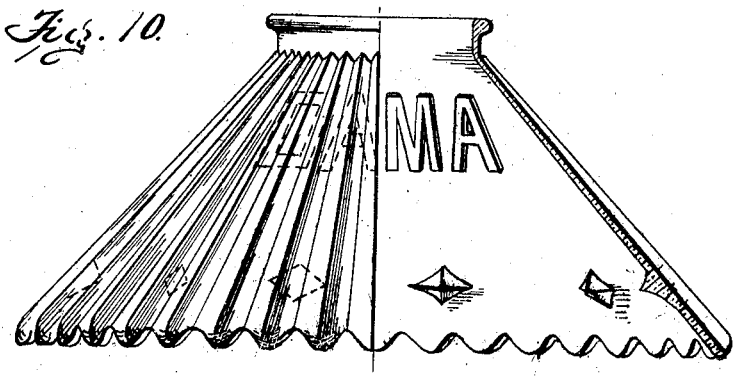
Figure 11:
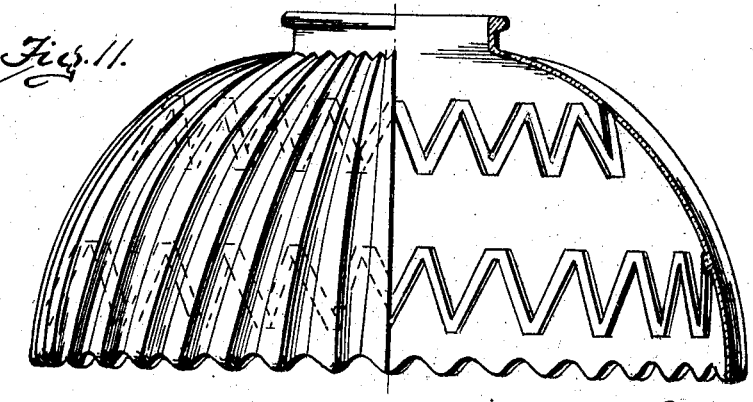

Figure 1 is a diagram illustrating the course of light-rays under certain conditions in relation to plane glass. Fig. 2 is a diagram illustrating such rays under other conditions in relation to plane glass. Figs. 3 and 4 are diagrams illustrating the course of light-rays on entering and emerging from certain forms of glass prisms. Fig. 5 is a view of a glass shade with internal decoration, the latter being indicated by dotted lines. Fig. 6 is a sectional view of a part of the same. Fig. 7 is a section of a modification. Fig. 8 is a section of a globe embodying substantially the same principles as the preceding. Fig. 9 illustrates a partial elevation and partial section of a globe having external prisms on its upper portion and a frosted surface on its lower portion and internal decorations throughout. Fig. 10 is a partial elevation and partial section of an open-mouthed reflector having external radial reflecting-prisms and internal decoration. Fig. 11 is a similar view of a modification.

In glass globes and shades for artificial lights other than prismatic globes and shades the object is generally to partially obscure the light-rays, so that they shall not be so dazzling and harmful to the eyesight. The light-rays generally pass through the substance of the globe or shade without much deviation, but with a partial obscuration due to a tint in the glass, frosting its surface, flutings, corrugations, &c. Such shades have been decorated in various manners—as, for instance, by painting usually in semitransparent colors—again, by the production of ornamental figures on the glass, generally on the exterior thereof, as this surface is easier to be operated on. Again, such globes and shades have been decorated by the addition of separate pieces, such as jewels or panels, inserted into, cemented on, or otherwise attached to the shades or globes. Many other styles of decoration for such articles are known; but as a rule no attention has been paid to the direction of the light-rays which pass through the decorated globes or shades. (For convenience I will hereinafter designate all such articles as "shades.") I have heretofore manufactured and sold many thousands of glass shades which were externally covered with prisms, which prisms direct the light-rays in calculated directions. Many of these are also internally covered with prisms which break up and diffuse the light-rays. An objection frequently made to such shades is that while they are useful as directing the light-rays to the desired field of illumination they are objectionable to many people because of their sameness of appearance. In some instances I have sought to give variety and decoration to such shades by the interruption or omission of some of the prisms. This of course is at the expense of the illuminating or light-directing power of the shade, as a complete prism is more effective than a mutilated prism. It is a law of optics that the polished surface of glass does not act as a good reflector for light-rays striking such surface in going from the air into the glass; but this same surface becomes an excellent reflector to light-rays striking its surface from inside the glass. Thus in Fig. 1, A B represents one surface of a polished piece of plane glass, and A' B' the other surface. Light-rays from P, perpendicular to the face A' B', will pass through the glass with little obstruction in the direction P', there being very little reflection, and this penetration continues if the angle be changed through an arc of some seventy-five degrees—say between P and X—and only for the fifteen degrees between X and the plane A' B' is the polished surface A' B' a fairly-good reflector. In Fig. 2 the light-rays from P pass, as before, to P'. Between P and Y for about forty-five degrees the light will penetrate more or less; but at Y—that is, forty-five degrees from the perpendicular—light-rays will be almost totally reflected in the direction Y'. Thus the second surface of the glass, rather than the first, is the effective reflecting-surface. No shade can increase the amount of light; but by directing light-rays, which would otherwise escape to a field of usefulness, the shade can be made to increase the effective amount of light from a lamp very materially. Rays generally lost are usually upward rays. Prism-glass shades, which either deflect or reflect such rays, generally depend on the external prisms to give direction to the rays, and interior prisms for softening or diffusing the rays. In Fig. 3, $A^2 B^2$ are supposed to represent the interior surface of a glass shade provided with prisms D on its outer surface. A light-ray from P passes through the glass and is reflected on the surface C D in the direction $P^2$. The other surfaces than the surface C D are considered practically neutral or negligible. The surface C D acts just as well as a reflector when it is covered with dust as when clean. The inner surface $A^2 B^2$ of the shade and the under surface D E of the prism will not accumulate dust to the same extent as the surface C D, and a shade provided with such prisms can be kept in good working condition with little care in the way of cleaning. In Fig. 4 the external double-reflecting prisms C' D' E' on a shade are caused to twice reflect the light-ray, which ray, progressing from P, returns to the inside of the shade in the direction $P^4$, the surface $A^3 B^3$ being practically inert or neutral. In this case also a layer of dust on the external prisms does no harm as far as the reflection of light is concerned. Availing myself of these laws, facts, and discoveries, I construct decorative shades having substantially all the advantages of light-control of the prismatic shades heretofore constructed, with the addition of high decorative adaptability.

In Fig. 5 I show a shade having its external surface covered with single-reflecting prisms 1. These prisms are all alike or of varied form, as may be desirable, to direct the light-rays which pass through the glass in any desired direction outside, such prisms being well known in the art. On the inside of the shade I produce, either in cameo or intaglio, ornamental forms or figures—as, for instance, a star 2. This figure will break up the monotony of the external appearance, as it will show through the glass and will to some extent break up the light-rays passing through it, but not with uniformity. The decorative form seen from without will present the peculiar silvery appearance which decorations impressed into or raised from the reverse surface of glass usually show, modified to some extent by the external prisms. The direction or distribution of the light-rays by the external prisms will be modified by reason of the raised or depressed decorative form on the interior of the shade. The light-rays which strike the projecting form on the interior of the shade are naturally more obscured by a thick body of glass than by a thin one. Besides this, many of these rays are diverted so that they strike the external prisms at different angles from what they would otherwise do, these diverted rays being given, in many instances, a new quality as well as a new direction. The result is that a shade which is externally covered with light-directing prisms will have a very different light-directing effect if the interior be smooth from that it will have if the interior be provided with either raised or depressed forms. Of course I do not intend that these decorative interior forms shall be limited in size, shape, or number. They may be changed in color as well as in form. It is generally advisable, however, to avoid colors which interfere much with the transmission of light, and such ornamentation as frosting, which interrupts light-rays, but may be used for some purposes.

As the exterior of the shade is entirely covered with prisms, the great majority of the rays which pass through the shade must receive their final direction from such prisms. The rays are therefore concentrated or focused, if concentration is desired, at such distance as the prismatic construction determines. At the same time the decoration of the interior of the shade may be as complete and as varied as if there were no prismatic surface whatever. As has been shown, the reflective effect of the interior of the shade is much less than the exterior, and therefore but little loss of light will be caused by this interior decoration.

The decorative forms or surfaces on the interior of the shade may be produced by molding or by cutting, engraving, or other well-known manner of ornamentation.

In Fig. 9 I illustrate the principle of internal decoration as applied to a globe having external circumferential light-distributing prisms. Such prisms each represent a number of outer plane surfaces calculated to direct the majority of the light-rays in determined directions. The rays emerge from the lower faces of these prisms, and a coating of dust on their tops does not prevent the effective operation of the prisms. The lower outer surface of the globe is "ground" or frosted. The frosting acts as a light-radiating surface. The interior of the globe is decorated with any ornamental forms desirable, as indicated at 6 6. These show through the prisms, but do not prevent the light distribution by the prisms to any material extent, although they change the character of such distribution. Being inside the globe the decorative figures do not accumulate dust to any great extent. In Figs. 10 and 11 the same principle is applied to prismatic glass reflectors. The external radial prisms reflect the light downward and out at the open mouth of the reflector, and their action is not diminished by an external coating of dust on the prisms. The internal decoration is protected from such dust by its position; but the decoration is visible both through the prismatic outer surface of the reflector and internally by direct observation. Such reflectors are generally seen from below. The decorative figures are impressed into or raised from the otherwise smooth inner surface of the reflector. The decorations may consist in words or lettering, as well as in other forms. Their effect is to break up light-rays to such extent that the decorations are visible; but they do not prevent the reflection by the prisms to any considerable extent.

From the foregoing it will appear that decorative shades made according to my invention have substantially all the decorative effect of any decorative shades heretofore made and have, in addition, the practical value of scientifically-constructed prismatic shades in the direction of a large proportion of the light-rays in determined directions, or, if the shade be considered as a prismatic shade, it has nearly all the advantages of prismatic shades heretofore constructed for the direction and distribution of light-rays, but slightly modified by internal decoration, and has, as far as may be, the "dust-proof" qualities of the best prismatic construction with substantially as full capacity for decoration as old forms of decorative shades.

What I claim is—

1. A shade composed of a single piece of glass having its outer surface substantially covered with light-directing prisms, and having its generally smooth inner surface provided with figures which are out of the general surface level, which figures change the direction of many of the light-rays passing through them toward the said prisms.

2. A shade composed of a single piece of glass having its outer surface substantially covered with light-directing prisms, and its inner surface generally smooth except as to certain decorative forms varying the general inner surface level to a greater extent in some parts than in other parts, whereby certain rays of light passing through such forms are acted on to a greater extent than other rays.

3. A shade composed of glass provided externally with light-directing prisms, and having its interior generally smooth, but having variations from the general level producing forms which divert certain of the light-rays from their normal direction toward said prisms, whereby the action of the prisms is also modified.

In testimony whereof I affix my signature in presence of two witnesses.

OTIS A. MYGATT.

Witnesses:
A. A. ERNST,
H. E. NASON.